Figure 1:
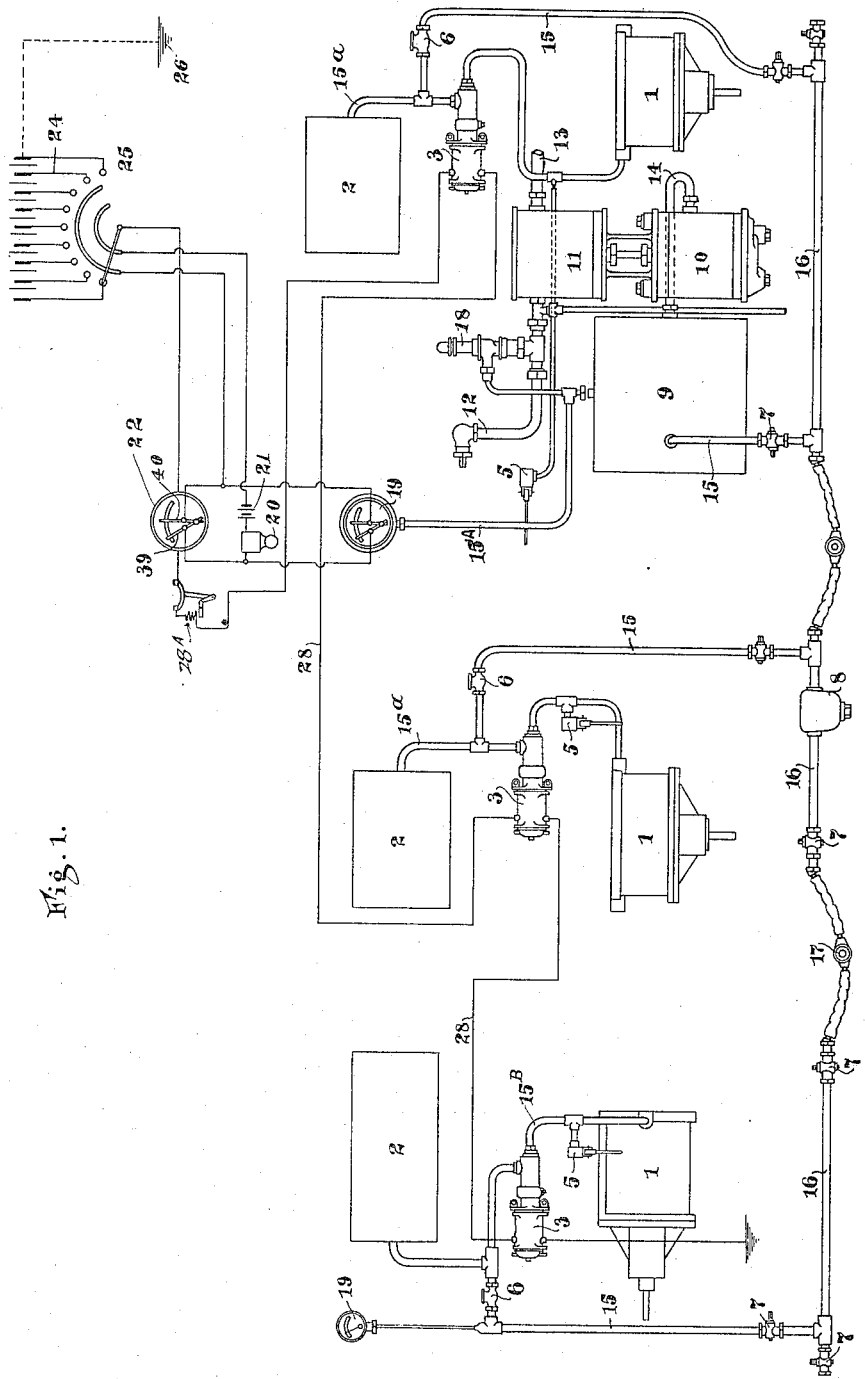

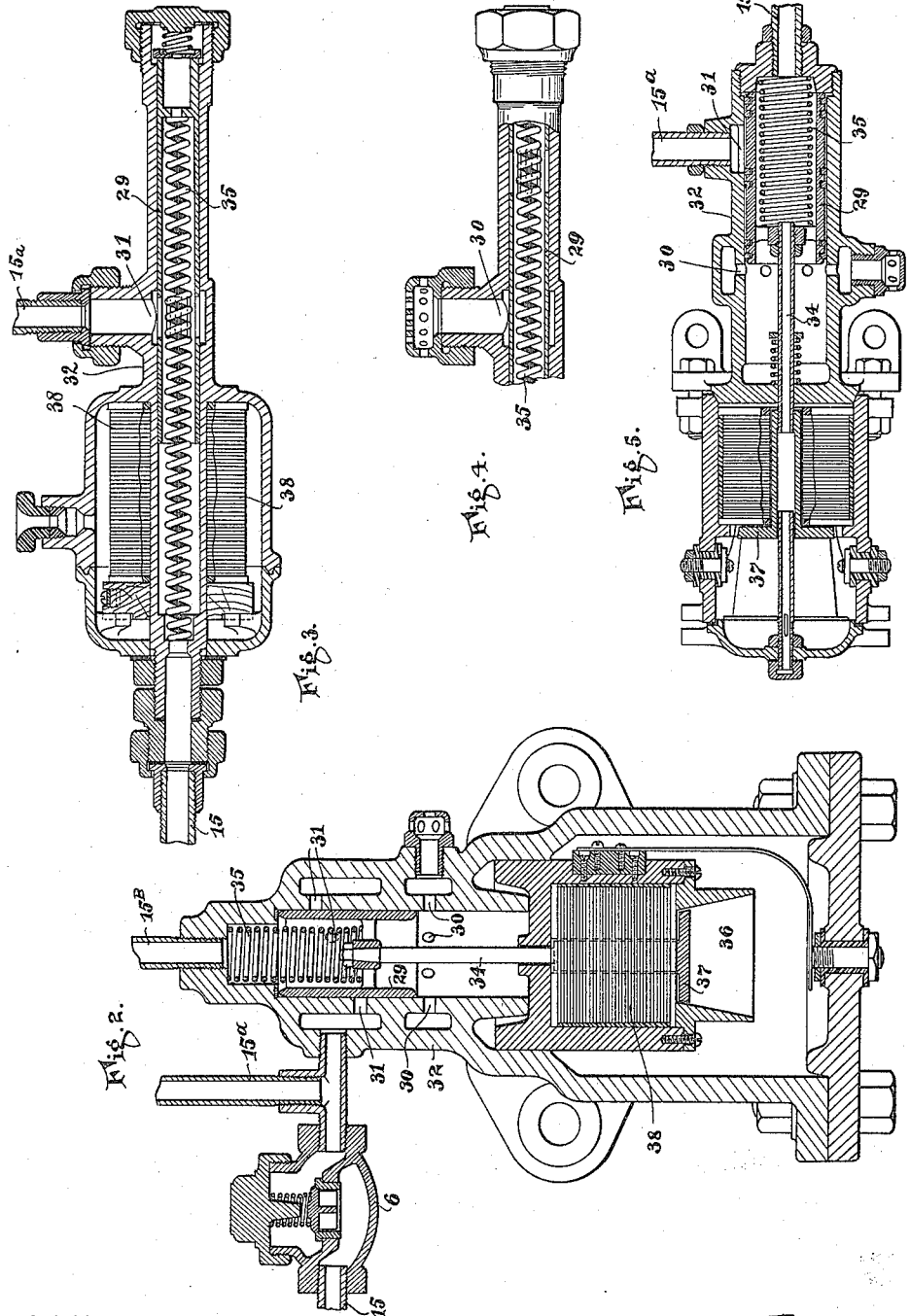

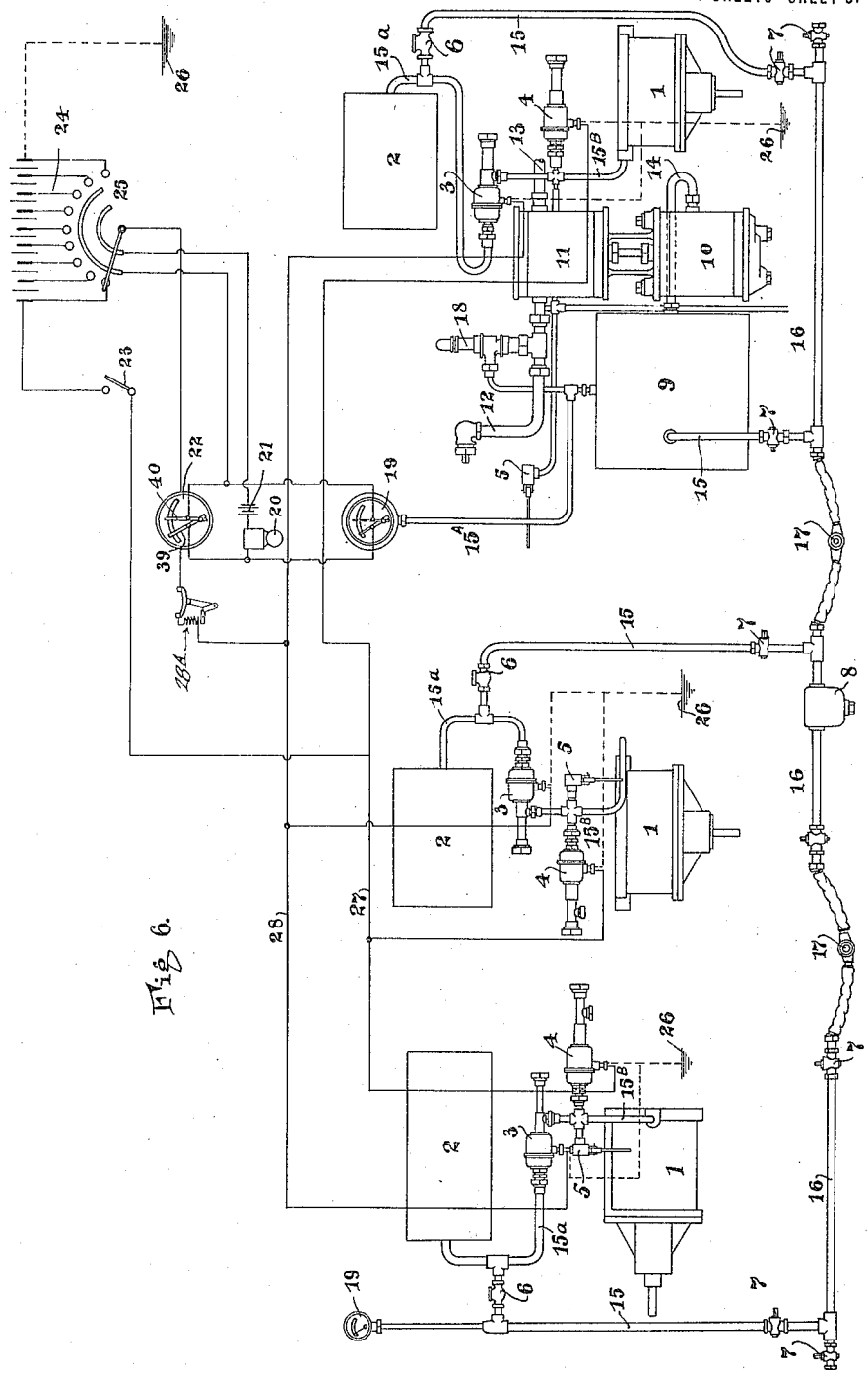

W. R. SMITH.
CONTINUOUS BRAKE.
APPLICATION FILED MAY 20, 1915.
1,161,543.
Patented Nov. 23, 1915.
4 SHEETS—SHEET 4.
Fig. 7.
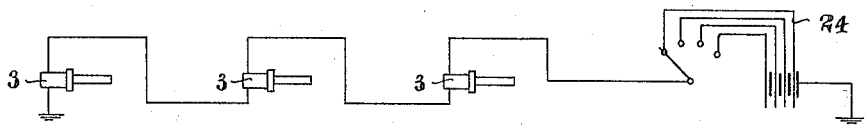
Fig. 7ª.
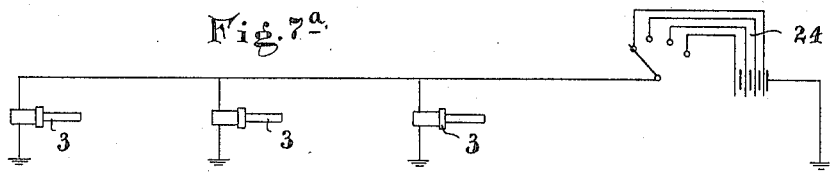
Fig. 7ᵇ.
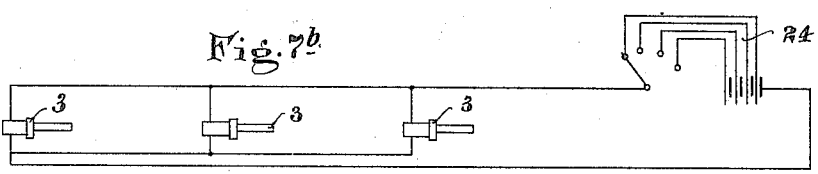
Fig. 8.
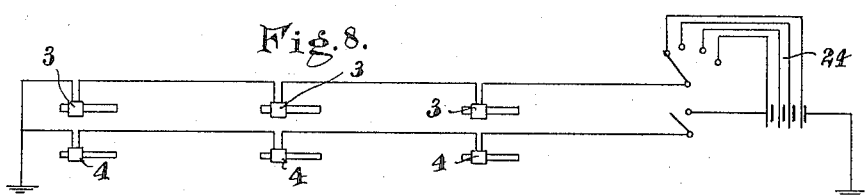
Fig. 8ª.
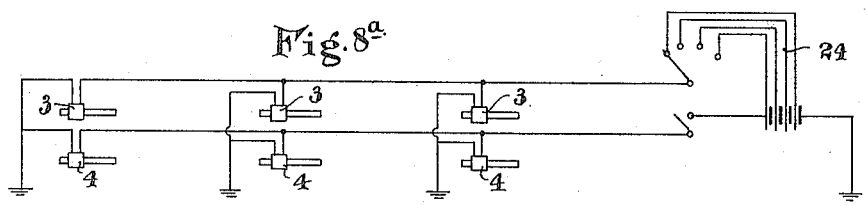
Fig. 8ᵇ.
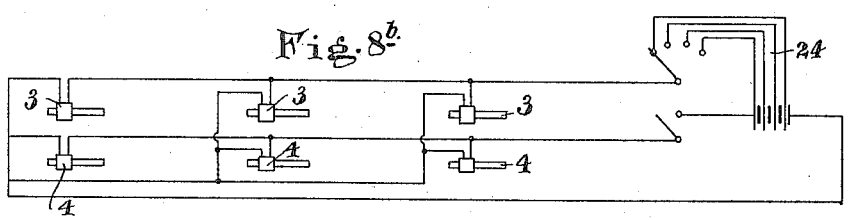
WITNESSES:
Frank H Logan
Cornelius Hering
INVENTOR:
W. R. SMITH
BY Van Oldenneel
ATTORNEY.
COLUMBIA PLANOGRAPH CO., WASHINGTON, D. C.

UNITED STATES PATENT OFFICE.

WILLIAM ROSE SMITH, OF BRAESIDE, CHALFONT ST. PETER, ENGLAND, ASSIGNOR OF ONE-THIRD TO REGINALD PAGE WILSON, OF WESTMINSTER, LONDON, ENGLAND, AND ONE-THIRD TO THE CONSOLIDATED BRAKE & ENGINEERING CO., LTD., OF LONDON, ENGLAND.

CONTINUOUS BRAKE.

1,161,543.  Specification of Letters Patent.  Patented Nov. 23, 1915.

Application filed May 20, 1915. Serial No. 29,448.

*To all whom it may concern:*

Be it known that I, WILLIAM ROSE SMITH, a citizen of the United Kingdom of Great Britain and Ireland, and resident of Braeside, Chalfont St. Peter, Buckinghamshire, England, have invented certain new and useful Improvements in Continuous Brakes, of which the following is a specification, such as will enable others skilled in the art to which it appertains to make and use the same.

This invention relates to continuous pneumatic or vacuum brakes of the kind in which an electric controller is adapted to control electro-magnet air valves which apply the brakes instantaneously and simultaneously on each coach of the train.

The invention has for its main object to provide an improved continuous brake which shall increase the rapidity and certainty of action in the application of such brakes to the wheels of railway or like rolling stock.

The invention comprises an electric controller, electric circuits connecting said controller to electro-magnets which operate the brakes, an ammeter, and a circuit breaker in said electric circuits adapted to apply all the brakes if the current falls below the amount for which the ammeter is set. The controller is adapted to control electro-magnetic air valves which apply the brakes on each coach of the train, said air valves comprising a piston movable in a casing and adapted when the electro-magnet is energized to place the brake cylinder into communication with the atmosphere, the said piston when the electro-magnet has been deënergized being moved by a spring to cover said ports and to uncover another set of ports in the casing so as to place the brake cylinder into communication with the air reservoir.

The usual driver's brake valve and the triple valve under each coach employed in the ordinary air pressure brakes are replaced respectively by an electric controller preferably on the driver's cab of the locomotive and by electro-magnetically controlled air valves on each coach. Instead of "the train pipe" communicating between the coaches and auxiliary reservoirs being used mainly as the means of permitting the control of the triple valves by change of pressure these pipes are merely used to convey the compressed or rarefied air to the auxiliary reservoirs.

The electro-magnetic air valve called hereinafter the pressure brake valve is provided with a valve spindle or piston rod which may be hollow or tubular for the equalization of the air pressure at opposite sides of the piston throughout the travel of the valve spindle or piston rod. The pressure brake valve is actuated in the known manner by an electro-magnet operating against an opposing force. When a spring is used as the opposing force the arrangement is such that when the spring is compressed the ports admitting compressed air from the reservoir to the brake cylinders are closed. If the current in the electro-magnet is reduced the spring partially overcomes the electro-magnet and moves the piston so that it closes the exhaust port from the brake cylinder to the atmosphere. The piston on being further moved uncovers one or more orifices in the valve casing and by so doing puts the compressed air in the reservoir more or less rapidly in direct communication with the pipe leading to the brake cylinder. Any known slide or mushroom valve may be combined with the electro-magnet and spring apparatus to form a pressure brake valve in connection with the controlling apparatus. The pressure brake valve is adapted to operate the vacuum brake by opening a port leading to the atmosphere and admitting the atmospheric pressure by the orifices in the valve casing to the brake cylinder. Where the compressed or rarefied air is supplied to auxiliary reservoirs by means of a train pipe a standard spring check valve is placed on the air pipe near each auxiliary reservoir. As soon as the electric current is cut off in the solenoids the brake is applied by the instantaneous opening of the pressure brake valve by the spiral spring and the simultaneous admission of compressed air (or of the atmospheric air in the vacuum brake) from the auxiliary reservoirs into all the brake cylinders. When the solenoids are again energized to a certain amount the pistons return not far enough to open the exhaust port to atmosphere but far enough to close the ports leading from the auxiliary reservoirs leaving in the brake cylinders a limited amount of compressed air that was supplied to them while the pressure brake valves remained open. As soon as the train has been brought to a standstill the compressed air in the brake cylinders is released by increasing the magnetization of the coils of the electro-magnet until the pistons are forced to the end of their stroke thereby opening the exhaust port to the atmosphere.

If desired the pressure brake valve may consist of two separate electro-magnets and pressure brake valves, one to apply the brakes and the other to take them off, the said valves being operated by a single handle which when moved toward one end of its throw applies the brakes, in an intermediate position holds them on, and at the other end of its throw releases them. The pressure brake valves may be connected either in series or in parallel.

Reference will now be had to the accompanying drawings which will serve to illustrate examples of the proposed brake system.

Figure 1 illustrates diagrammatically the general arrangement of the brake system including the carriage equipment with guard's van fittings, tender equipment and engine equipment. Fig. 2 shows a section of the single electro-magnetically controlled air valve, standard check valve, and passages and ports for compressed air working. Fig. 3 shows in section an electro-magnetic air valve for a brake application valve. Fig. 4 shows in section a portion of the brake application valve showing the alteration necessary to convert said valve into a brake release valve. Fig. 5 is a longitudinal section of a modified form of the pressure brake valve. Fig. 6 illustrates diagrammatically the general arrangement of the brake system when two valves are employed, one to apply the brakes and the other to release the brakes. Fig. 7 illustrates a series system of wiring for the combined brake and release valve. Fig. 7ª illustrates a parallel system of wiring for the combined brake and release valve. Fig. 7ᵇ illustrates another parallel system of wiring for the combined brake and release valve. Fig. 8 illustrates a series system of wiring for independent brake and release valves. Fig. 8ª illustrates a parallel system of wiring for independent brake and release valves, and Fig. 8ᵇ illustrates another parallel system of wiring for independent brake and release valves.

For the better understanding of the working of the invention the whole of the parts of a multiple unit brake system are shown in Figs. 1 and 6. In these figures the usual brake cylinders 1 are supplied with compressed air from the auxiliary reservoirs 2 by the air pipes 15ª through the electro-magnetic or pressure brake valves 3 which may also serve to release the brakes or they may be released by mechanically operated release valves 5.

In Fig. 6 the brakes may be released by the electrically operated release valve 4 or by mechanically operated release valves 5. 6 designates the standard check valves and 7 the isolating air cocks which are connected to the train pipe 16 by the pipes 15. A drip cup 8 is shown on the train pipe 16, which latter is also connected to the main reservoir 9 by an air pipe 15 and isolating cock 7. The air pump 10 in the engine is preferably actuated by the steam engine 11 driven by the steam supply led by the pipe 12 and discharged by the exhaust 13. If desired, however, the air pump may be driven by an electric or other motor. The compressed air is conveyed from the air pump 10 by the air pipe 14 to the main reservoir 9. The air pipe 15 conveys the supply of compressed air between the main reservoir 9 and the train pipe 16. The air pipes 15ᴬ convey the compressed air to the pressure gages 19. The pipes 15ª establish communication between the auxiliary reservoirs 2 and the pressure brake and release valves 3 and 4. The air pipe 15ᴮ conveys the compressed air from the pressure brake valves 3 and 4 to the brake cylinder 1 and from the brake cylinder to the atmosphere.

On the multiple unit brake gear shown with auxiliary reservoirs 2 the train pipe 16 is connected up by flexible connections and hose couplings 17 with isolating cocks 7 and drip cups 8. The engine equipment shown on the right of the figure includes a bell 20 to signal to the driver to re-adjust his ammeter when necessary, a local battery 21, duplex ammeter 22, brake release switch 23, Fig. 6, main battery 24, driver's brake valve regulator 25, and earth connections 26. The wiring includes release valve lead 27, Fig. 6, the brake valve lead 28 and all the necessary connections and earth connections 26. The switch 23 is used when there is one handle as in Fig. 6 to release the brakes after arrival at the station. The electro-magnetic air valve called hereinafter the pressure brake valve and shown in detail in Figs. 2 to 5, preferably consists of a tubular piston 29 of sufficient length to cover and uncover two sets of ports 30 and 31 in a valve casing or cylinder 32 on being moved in a longitudinal direction, or one port in the case of Figs. 3 and 4. The valve spindle or piston rod 34 may be hollow or tubular as shown in Figs. 3, 4 and 5 for the equalization of the air pressure on opposite sides of the piston throughout the travel of the valve. The piston of the pressure brake valve, Figs. 2 and 3, is operated by a spiral spring 35 at one end, and by an electromagnet 36 at the other end, so that, so long as the electro-magnet 36 is energized the armature 37 is attracted by the solenoid 38, the spring 35 is compressed and the ports 31 admitting compressed air from the reservoir 2 by means of the pipe 15$^a$ are closed (the position of the valve piston 29 shown in Fig. 2). If the current in the solenoid 38 is reduced the spring 35 partially overcomes the electro-magnet 36 and the piston 29 begins to move thereby disconnecting brake cylinder 1 from atmosphere by closing the exhaust port 30 because pipe 15$^B$ is connected to the brake cylinder 1. On being further moved the piston uncovers one or more of the orifices 31 in the valve casing 32 and by so doing puts the reservoir 2 in direct communication with the pipe 15$^B$ leading to the brake cylinder 1. When the brakes are operated by vacuum the pressure brake valve is adapted by the movement of its piston to operate the vacuum brake by admitting the atmospheric pressure to the brake cylinder. This construction is not shown on the drawings as it is substantially similar to that illustrated, and is merely a question of suitable pipe connections. As soon as the electric current is cut off in the solenoids 38 the brake is applied by the instantaneous opening of the pressure brake valve by the spiral spring 35, and the simultaneous admission of compressed air from the auxiliary reservoir 2 (or of the atmospheric air in the vacuum brake) into the brake cylinders 1. When the solenoids 38 are again energized a certain amount the pistons 29 are returned far enough to close the ports 31 leading from the auxiliary reservoirs 2 leaving in the brake cylinders 1 the compressed air that was supplied to them while the pressure brake valves remained open. As soon as the train has been brought to a standstill the compressed air in the brake cylinders 1 is released by increasing the magnetization of the solenoid coils 38 until the pistons 29 are forced to the end of their stroke which opens the exhaust port 30 to the atmosphere.

In a modification the pressure valves may consist of two distinct solenoids 38 and pressure brake valves 3 and 4, one 3 to apply the brakes and the other 4 to take them off. Such arrangement is shown in the carriage equipment and guard's van fittings shown to the left of Fig. 6 in the tender equipment shown in the center of the figure and in the engine equipment.

In wiring the modification with two solenoids 38 and pressure brake valves 3 and 4 two wires 27 and 28 are necessary or four (by the addition of two return wires) if the valves are so connected that all the brakes are applied automatically in the event of a break away. Both valves may if desired (although not so shown on the drawing) be operated by the one handle 25 which when moved toward one end of its throw applies the brakes, when in an intermediate position holds them on, and when moved to the other end of its throw releases them.

For the form of pressure brake valve shown on Figs. 2 and 5 that is where the one valve and apparatus applies and releases the brakes, the wiring may be connected either in series or in parallel.

The operation of the apparatus with the coils in parallel is as follows: The coaches in all cases have the brakes disconnected in the marshaling yard and as soon as the train is made up the electrical circuit is established and adjusted (irrespective of the number of cells connected, or the number of amperes flowing) so that the solenoids 38 are magnetized and the brakes "off." The needle 40 of a suitable ammeter 22 will carry with it a loose pointer 39 permanently arranged so that it stands at say one ampere behind the ammeter needle 40 itself, or alternatively the loose pointer 39 may be arranged so that it may be set by hand to a position corresponding to one less than the number of coaches connected. An audible signal such as an alarm bell 20 connected in series with the ammeter needle 40 and loose pointer 39 will then have its circuit closed if one or more coaches accidentally break away or are purposely disconnected, so that the driver's attention is immediately called by the bell 20 ringing to make the re-adjustment on his ammeter 22 to suit the new number of coaches. The circuit through the ammeter needle 40 and pointer 39 is closed through contacts on the ammeter needle and the loose pointer. When the current is reduced the ammeter needle recedes until it reaches the loose pointer and beyond this point both recede together. The solenoid circuit 27 and 28 is also fitted with a circuit breaker 28$^A$ set to disconnect cells 24 and so apply all the brakes if the current falls below the amount for which the ammeter 22 is set. The circuit breaker would come into action as soon as the coach was disconnected because the resistance of the circuit 27 and 28 would be increased and the current consequently diminished. The automatic application of the brakes by means of a circuit breaker may be unnecessary if the driver can be relied upon to shut off the main stop valve of the engine, or to cut off the supply to the controllers in an electric train and then apply the brakes in the usual way on his attention being called by the alarm bell 20 to a break away.

In the parallel wiring the current adjusts itself automatically to the number of coaches. The solenoids 38 are in the above arrangement earthed at each coach, but they may alternatively be connected to a common return wire running the whole length of the train in which case a disconnection would apply all the brakes simultaneously without the intervention of a circuit breaker.

If the solenoids 38 are connected in series the same amount of current will be required with any number of coaches. In this arrangement a breakaway or a disconnection will cause all the brakes to be applied and remain on until the air pressure in the brake cylinders 1 has been discharged and the electric current reinstated. The only precaution required is the adjustment by the driver of the E. M. F. to suit the number of coaches when it is changed.

Having now particularly described and ascertained the nature of my said invention and in what manner the same is to be performed, I declare that what I claim is:

1. A continuous pneumatic or vacuum brake comprising an electric controller, electric circuits connecting said controller to electro-magnets which operate the brakes, an ammeter, and a circuit breaker in said electric circuits adapted to apply all the brakes if the current falls below the amount for which the ammeter is set.

2. In a continuous pneumatic or vacuum brake, the combination of a source of current; an electric controller; an ammeter; a plurality of reservoirs; a brake cylinder for each reservoir; electromagnetic means associated with the cylinder and corresponding reservoir to establish communication therebetween and thereby apply the brake, when current ceases to be applied to said electromagnetic means; means for electrically connecting the electromagnetic means, source of current, controller and ammeter and forming an electric circuit which when broken ceases to supply current to the electromagnetic means, whereupon the brakes are applied; and an underload circuit breaker adapted to break said circuit when the current therein falls below the amount for which the ammeter is set.

3. In a continuous pneumatic or vacuum brake, the combination of a plurality of reservoirs; a brake cylinder for each reservoir and provided with a port communicating with the reservoir and one communicating with the atmosphere; an air valve comprising a piston adapted to cover one or the other of said ports; a spring for moving the piston to cover the port communicating with the atmosphere; a magnet for moving the piston to cover the other port; a source of current; a controller; an ammeter; means electrically connecting the magnets, said source, controller and ammeter and forming an electric circuit; and an underload circuit breaker in said circuit.

4. In a continuous pneumatic or vacuum brake, the combination of a plurality of reservoirs; a brake cylinder for each reservoir; an air valve for each cylinder and comprising a casing having a port communicating with the cylinder, and a tubular piston in the casing adapted to cover or uncover said port; springs for moving the piston in one direction; electromagnets for moving the piston in the other direction; a source of current; a controller; an ammeter; means electrically connecting the magnets, source of current, controller and ammeter and forming therewith an electric circuit and an underload circuit breaker in said circuit.

5. In a continuous pneumatic or vacuum brake, the combination of a plurality of reservoirs; a brake cylinder for each reservoir; electric means associated with each brake cylinder for establishing communication with the reservoir to apply the brake when the current ceases to be supplied thereto; a source of current; a controller; an ammeter; means electrically connecting the electric means, source of current, controller and ammeter and forming an electric circuit which when broken ceases to supply current to said electric means; and an underload circuit breaker in said circuit.

6. In a continuous pneumatic or vacuum brake, the combination of a source of current; an electric controller; an ammeter; a plurality of reservoirs; a brake cylinder for each reservoir; electro-magnetic means associated with the cylinder and corresponding reservoir to establish communication therebetween and thereby apply the brake, when current ceases to be applied to said electromagnetic means; means for electrically connecting the electro-magnetic means, source of current, controller and ammeter and forming an electric circuit which when broken ceases to supply current to the electro-magnetic means, whereupon the brakes are applied; an underload circuit breaker adapted to break said circuit when the current therein falls below the amount for which the ammeter is set and a signal associated with said ammeter and adapted to operate when the pointer of the ammeter moves a distance from the position at which it is set.

In witness whereof I have hereunto set my hand in presence of two witnesses.

WILLIAM ROSE SMITH.

Witnesses:
H. D. JAMESON,
O. J. WITTLE.